Dec. 17, 1957 E. F. DYSON 2,816,562
ADJUSTABLE PROPORTIONATING SPRING
ASSEMBLY AND CONTROL SYSTEM
Filed Jan. 5, 1954 2 Sheets-Sheet 1

Dec. 17, 1957  E. F. DYSON  2,816,562
ADJUSTABLE PROPORTIONATING SPRING
ASSEMBLY AND CONTROL SYSTEM
Filed Jan. 5, 1954  2 Sheets-Sheet 2
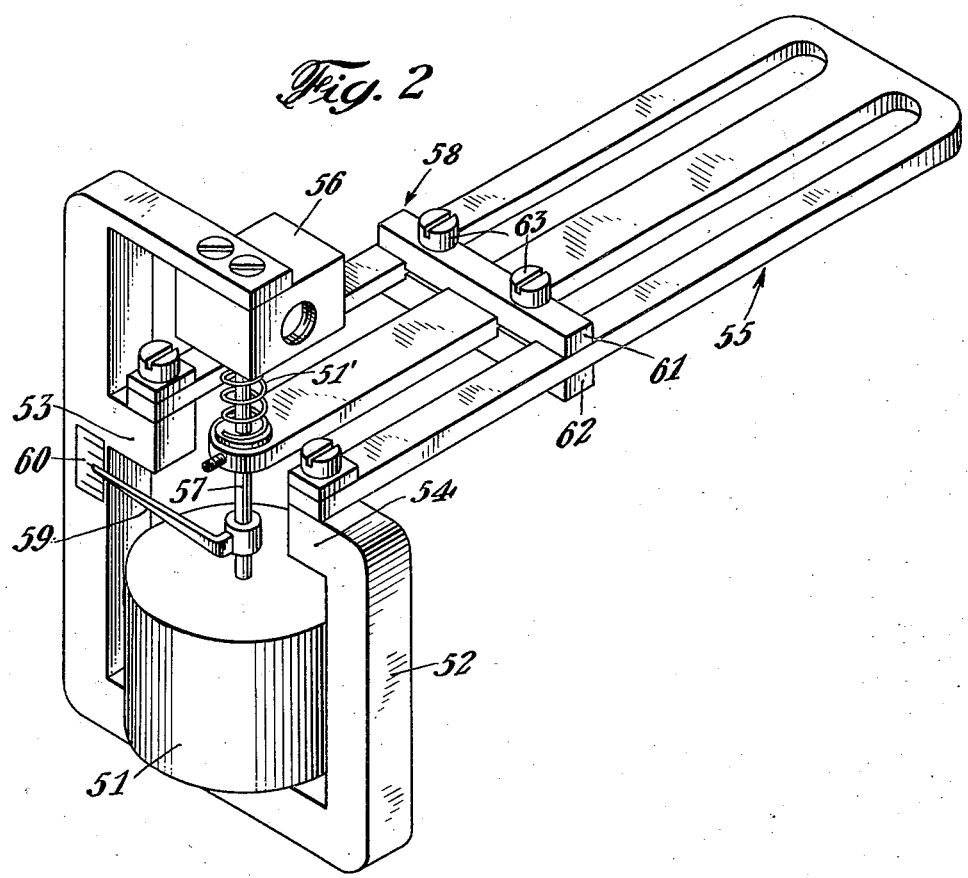
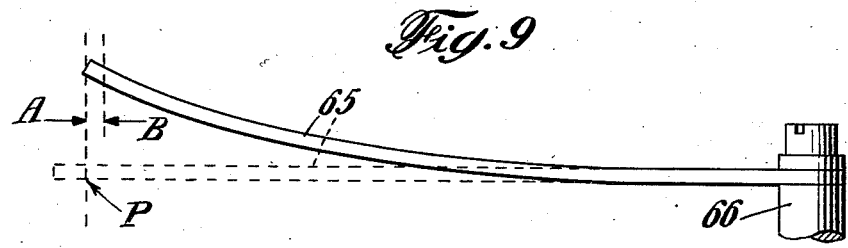
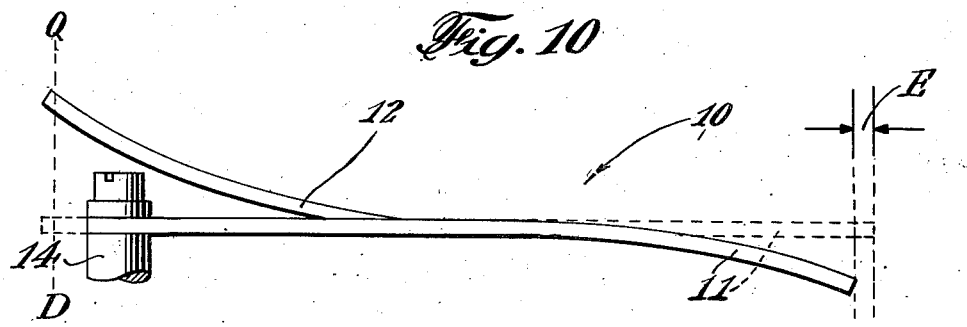

United States Patent Office 2,816,562
Patented Dec. 17, 1957

2,816,562

ADJUSTABLE PROPORTIONATING SPRING ASSEMBLY AND CONTROL SYSTEM

Ernest F. Dyson, Meriden, Conn., assignor to The Bristol Company, Waterbury, Conn., a corporation of Connecticut Application January 5, 1954, Serial No. 402,354

12 Claims. (Cl. 137—85)

This invention relates to resilient adjustment means and more particularly to such means which readily permit a wide range of adjustment as well as an automatic controller embodying the same.

It is well known that in the manufacture of instruments, as with most other industrial products, it is desirable in the interest of economic production that as wide a range as possible of applications be met by a minimum number of structures, whereby the number of different parts characterizing different operating ranges to be kept at a minimum. In the design and utilization of automatic control devices there exist two features which are subject to a wide range of selective adjustment. These are the calibration of the primary measuring element and the proportional band range or "sensitivity." The manufacture of a single style of instrument to cover all possible requirements respecting these adjustments is obviously an advantage, but application of such instruments to measurements or processes needing either the widest, or the narrowest, adjustment is handicapped because of the limited usable portion of the available adjustment.

It is a principal object of the present invention to provide an automatic controller which may readily be adjusted for response to widely varying conditions while at the same time retaining to a maximum degree precisely accurate responsiveness to the selected conditions.

Another object is to provide control apparatus adapted to operation under a wide range of variable conditions, and comprising performance varying means adjustable through a wide range without structural alterations while embodying compactness to an exceedingly high degree.

A further object is to provide adjustable means in the form of a spring, or springs, characterized by substantially straight line deflection, linear performance and ease of adjustment.

In carrying out the purposes of the invention there is provided an automatic controller having readily adjustable resilient means a variation of which determines the operating range and the sensitivity of the control means of the system. Preferably, the adjustable resilient means is constructed in the form of a trichotomous, or three-pronged, cantilever spring of adjustable effective length, adjustment thereof serving to vary the "spring constant" of the spring. On being deflected, at least one end portion of one of the spring members travels a substantially straight-line path.

In the drawings:

Figure 2 is an isometric projection of a three-pronged spring assembly of a type especially suited to the purposes of the invention.

Figures 9 and 10 are diagrams illustrating respectively the performance of a cantilever spring of the prior art and that of a three-pronged spring incorporating the present invention.

Figure 3:
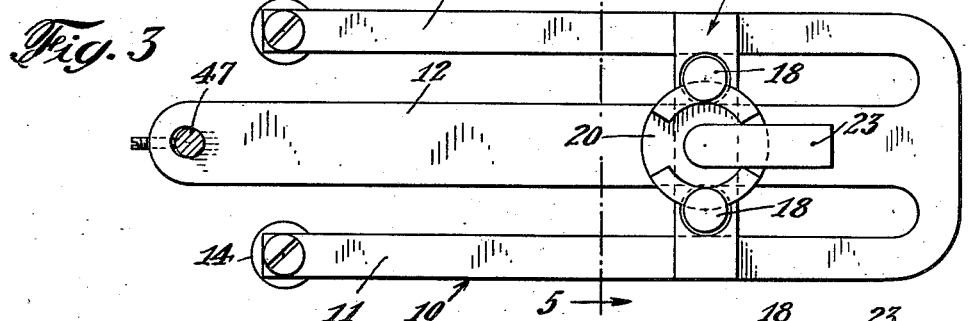
Figure 3 is a top elevation of a spring assembly similar to that shown in Figure 2.
Figure 4:
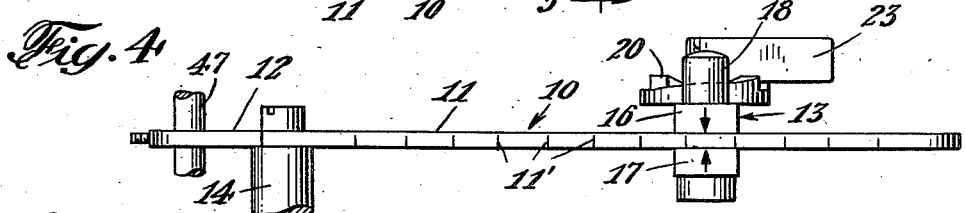
Figure 4 is a side elevational view of the spring assembly shown in Figure 3.
Figures 5, 6, 7, 8:
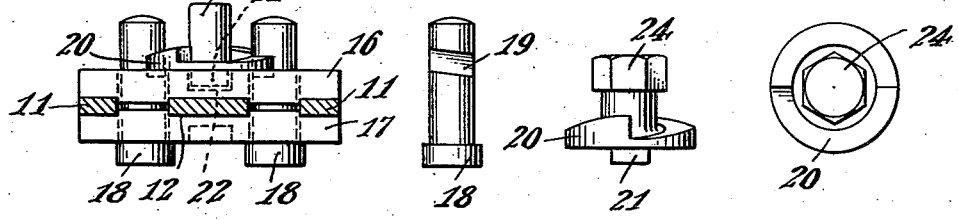
Figure 5 is a sectional view taken through the line 5—5 of Figure 3.
Figure 6 is an elevational view of a bolt member of the spring assembly shown in Figure 3.
Figures 7 and 8 are side and top elevational views respectively of a modification of the locking nut shown in Figures 3, 4 and 5.

Referring now to the drawings, and in particular to Figures 3, 4 and 5, spring 10 is formed from sheet metal, such as steel, and comprises a forked structure having two laterally positioned parallel external arms 11 and an intermediate arm 12, all said arms normally lying in a common plane and being joined together at one end thereof. Each of the arms 11 is perforated adjacent its other extremity, whereby it may be secured by means of a bolt or screw to a suitable abutment 14. The middle arm 12 is made of a width approximately double that of either of the arms 11, and, as shown in Figure 3, may be extended beyond the other arms to provide space for attachment of movable members.

Adjustment of the effective strength, or "spring constant" of the spring 10 is provided by a clamping member 13, hereinafter to be described in fuller detail, adapted to extend across the three arms of the spring, whereby, when in its clamped condition, to integrate the three arms into a unit along the line of clamping, so that the effective part of the spring is restricted to that portion lying to the left of the clamping member as seen in the drawings, that part lying to the right remaining inert and ineffective.

Figure 1:
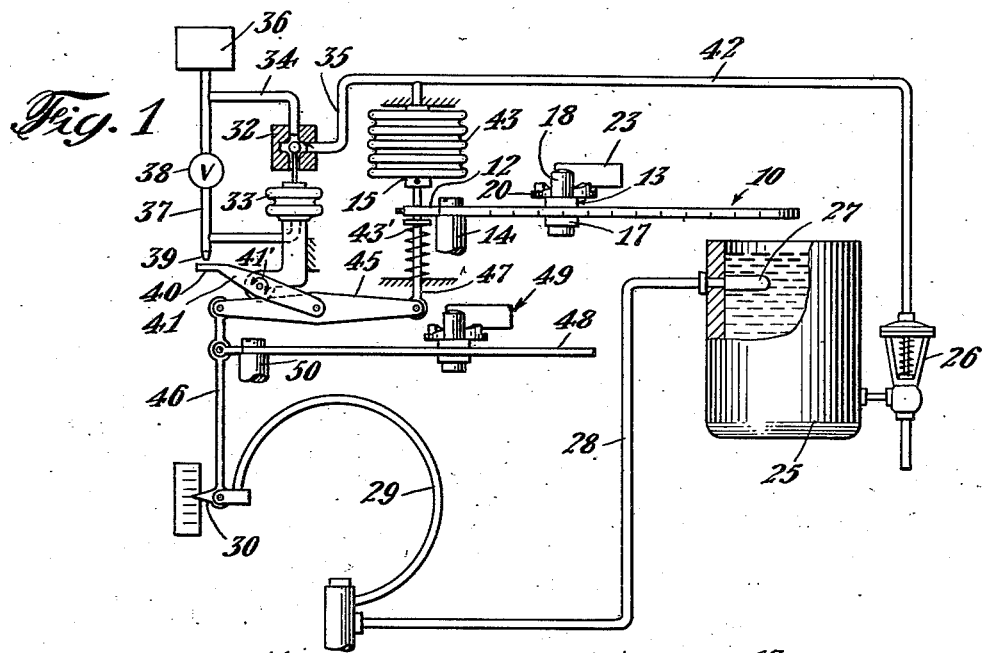
Figure 1 is a diagrammatic representation, partly in section, of an automatic control installation embodying the principles of the invention.

Spring 10 is mounted at the extremities of the arms 11 on suitable abutments 14, so spaced that the arm 12 may pass freely between them for deflection in a sense perpendicular to the plane of the flat surface of the spring. The free extremity of the arm 12 is connected, as indicated in Figure 1, to the movable end 15 of a control member to be more fully described hereinbelow, whereby to partake of deflection of the same. The effective length of the spring in its influence upon the control member and attached parts is thus the sum of the length of one of the arms 11 and the arm 12 between the clamping bars and the left-hand extremity of the spring, as seen in the drawing. The arm 12 being made of a cross-section substantially equal to the sum of those of the arms 11, the total deflections of the two sections into which the spring is inherently divided by the clamping members will be substantially equal for a given stress. It will be seen that as the clamping member 13 is positioned toward the right, the effective length of the spring 10 will be increased and its effect correspondingly weakened, while its strength will be increased by shifting the clamps toward the left. Thus, by selectively positioning the clamping members in a suitable location along the spring, the degree of response of the control member may be adjusted as desired. As an indicator of the effective adjusted strength of the spring 10, the visible edge portion of an arm thereof may be provided with graduations 11', as indicated in Figure 4, which, cooperating with an index or reference mark marked on the clamping member 13, provides a measure of the effective length of the spring and hence of its influence upon the action of the control member.

The clamping device 13 may take any one of several forms consistent with rigidly and securely integrating the three arms of the spring at a predetermined and fixed distance from the mounting abutments. In the form shown in Figures 3, 4 and 5, the clamping members comprise a pair of bars 16 and 17 adapted to be positioned transversely of the spring member 10, and preferably formed with alternate grooves and raised portions whereby said bars will be maintained symmetrically in said transverse position, while free to be located as desired longitudinally of the spring. Through openings formed in said bars and in alignment with the spaces between adjacent arms of the spring when assembled are passed two bolt members 18, each formed, as shown in Figure 6, with a transverse slot 19 forming a slight angle with a plane perpendicular to the axis of the bolt. The slots 19 are so located longitudinally of the bolts 18 that when the latter are passed through the clamping bars 16 and 17 in their assembled position on the spring and with the heads of said bolts engaging the "lower" surface of the bar 17, the openings of said slots will extend well above the "upper" surface of the bar 16.

Securing the bolts 18 in their positions is a rotatable "nut" 20 having a flat surface adapted to rest on the bar 16 and provided with diametrically opposed helical surfaces to enter the slots 19, and, engaging the sloping surfaces thereof, to exert a wedging action as said nut is rotated about its axis, whereby to stress said bolts and exert a clamping action forcing the bars 16—17 into clamping cooperation with the flat faces of the three arms of the spring 10. The nut 20 may have formed axially thereon a stud portion 21, and the clamping bar 16 have centrally bored in its upper surface a circular recess 22, which, engaging said stud, will constrain the nut 20 for rotary displacement about its axis. By giving the helical surfaces of the nut 20 a slightly conical conformation, and making the stud 21 a loose fit in the recess 22, the nut will be free for limited lateral displacement, and, when tightened, will tend to assume a position substantially to equalize the clamping forces exerted by the two bolts 18. The nut 20 is provided with a laterally extended portion or handle 23, whereby to be rotated for clamping purposes. The form of nut shown in Figures 7 and 8 is in all respects identical with that shown in Figures 3, 4 and 5, excepting that the integrally formed handle 23 of the latter is replaced by a polygonal section 24, whereby a suitable wrench may be used in rotating the nut.

As a structural refinement, and as an expedient to prevent accidental dismemberment of the clamping assembly, the length of the stud 21 may be made such that, even with the nut rotated in a counterclockwise sense to its loosest position, engagement of the slots 19 in the bolts 18 with the helical surfaces of the nut will prevent its being raised far enough to be removed from its assembled location. In order for complete disassembly to be effected, it is necessary not only to loosen the clamping members, but, after disengaging the spring 10 from its mounting abutments, and removing the pivot attachment from the extremity of the middle arm, to slide the assembly of clamping bars, bolts and nut off the left-hand end of the spring. Until this is accomplished, it is impossible to bring the clamping bars sufficiently close together to permit the stud 21 to be completely disengaged from the recess 22 and the nut 20 laterally displaced, whereupon the bolts 18 may be removed and the assembly completely dismantled.

A general class of control instrumentalities to which the present invention is advantageously applied includes fluid actuated controllers. The advantages attained in accordance with the present invention will be apparent from the following description with reference now to Figure 1 in which 25 designates an enclosed vessel or chamber wherein it is desired to maintain a predetermined constant temperature by the regulation of a temperature-affecting fluid agent through a pneumatically controlled valve 26, of the class wherein an increase in applied operating pressure tends to close the valve. Determination of the temperature of the contents of the container 25 is effected by means of a fluid-filled bulb 27 suitably located and exposed to the medium whose temperature is to be regulated. The bulb 27 is connected by means of a suitable capillary conduit 28 to a Bourdon spring 29 fixed at one extremity and free at the other, whereby, according to well-known principles, the free extremity will be deflected and will assume different positions with changes in the temperature to which the bulb is exposed. The free extremity of the Bourdon spring 29 may be fitted with a pointer or index 30 adapted to coact with a juxtaposed graduated scale in providing an indication of the deflected position of the spring extremity, and hence a measure of the temperature to which the bulb 27 is exposed.

A pilot valve 32 of the supply-and-waste type mounted for operation by a capsular spring or bellows member 33, is provided with an inlet connection 34 and an outlet connection 35, and is so arranged that decrease of fluid pressure within the bellows 33 will tend to open communication between the inlet and outlet connections 34 and 35 whereby to admit air or other pressure fluid from a source 36, with which the former communicates, to the outlet connection 35, while increase of pressure in the bellows 33 will tend to close said communication and allow air in the connection 35 to vent to the atmosphere. A conduit 37 communicating with the interior of the bellows 33 and, through an adjustable constriction 38, with the source 36, is provided with nozzle portion 39 adapted to be more or less obstructed by a vane, flapper, or obturator 40 carried on the extremity of a centrally pivoted lever-arm 41. Lever-arm 41 is pivotable about its support, as indicated by arrow 41'.

A conduit 42 provides communication between the outlet connection 35 of the pilot valve 32 and the actuating member of the valve 26, whereby to render the position, or degree of opening, of said last-named valve responsive to the fluid pressure within said conduit, and thus to the pressure within the capsular spring or bellows 33. Internally communicating with the conduit 42 is a bellows member 43, fixed at one extremity and at the other free for linear deflection according to the pressure therein.

Carried by the lever-arm 41 at its extremity remote form the flapper 40, and pivotally mounted thereon, is a floating, or differential, lever arm 45 having one of its extremities connected to the free end of the Bourdon spring 29 by means of a link 46 and the other of its extremities connected to the free extremity 15 of the bellows member 43 by means of a link 47, bellows member 43 functioning in this instance as the control member referred to hereinabove. The relative positioning and alignment of said lever-arms, links and pressure-responsive members is such that displacement of the free extremity of the Bourdon spring 29 in response to increase of pressure therein, acting through the link 46 and one end of the floating lever 45, will move the lever-arm 41 and the flapper 40 carried thereby in a sense to lessen the obstruction of the orifice 39 and increase the escape of pressure-fluid therefrom. Increase of pressure within the bellows member 43, acting through the link 47 upon the other end of the floating lever 45 will tend to close the orifice 39, decreasing the escape of pressure-fluid therefrom.

A typical cycle of operation of the apparatus as thus far set forth may be described as follows: Assume first a quiescent state where the supply of heat-affecting agent through the valve 26 is just sufficient to maintain at the desired predetermined value the temperature of the controlled medium within vessel 25 as determined by the bulb 27 and expressed by deflection of the Bourdon spring 29, and indicated by the position of the pointer 30 with respect to the scale juxtaposed thereto. The pressure in the conduit 42 and in the bellows 43 being steady, the lower end of the link 47 will provide a fixed pivot point for the right-hand end of the lever 45, so that its left-hand end will assume a position corresponding to that of the extremity of the Bourdon spring 29, as communicated to it by the link 46. So long as the link 47 remains stationary, the angular position of the lever 41, and therefore the degree of opening of the orifice 39 will thus be exactly representative of the value of the temperature within the enclosure 25.

Assume, now, that for some reason the temperature of the bulb 27 should fall. This will result in a reduction of pressure within the filled system of which the Bourdon spring 29 forms a part, and a consequent displacement of its free extremity in a sense downward as seen in the drawing, similarly displacing the left-hand end of the lever 45, causing the lever-arm 41 to be rotated through a small angle in a clockwise sense whereby the flapper 40 is brought closer to the orifice 39, increasing the obstruction to escape of pressure-fluid therefrom, and producing a rise in pressure within the capsular spring 33. The increased pressure in the spring 33 will cause it to react upon the pilot valve 32 in a sense to lower the pressure in the conduit 42, allowing the main control valve 26 to be opened, admitting more of the temperature-affecting agent, and tending to offset the temperature drop by which the described control action was initiated. In a similar manner, an increase of the regulated temperature above the desired value will result in a series of actions eventuating in a closing of the valve 26 and a reduction in admission of the temperature-affecting agent.

Consideration may now be given to the function and performance of the bellows member 43 and associated elements of the mechanism. The bellows 43, fixed at its upper end, being interiorly in communication with the conduit 42 will respond to changes of pressure therein in a sense that with an increase of said pressure the lower extremity 15 of the bellows, and the attached link 47 will move in a downward direction as seen in the drawing, correspondingly lowering the right-hand extremity of the floating lever 45 and rotating the lever 41 through a small angle in a clockwise sense. Similarly, a decrease in pressure within the conduit 42 will result in a tendency for the lever 41 to be rotated in a counter-clockwise sense, correspondingly moving the vane of flapper 40 away from the orifice 39. Thus, it will be seen that each action of the controlling apparatus will be attended by a secondary action, tending to re-establish the control point. This "resetting" characteristic is highly desirable in stabilizing the performance of the apparatus described.

In order for the resetting elements of the mechanism to be properly effective in stabilizing the performance of the apparatus, it is essential that the intensity of response of the bellows member 43 to changes of pressure in the conduit 42 be carefully regulated, and also be subject to a wide range of adjustment according to processes upon which the apparatus may be used. Accordingly, there is provided cantilever spring 10, which to a high degree combines the characteristics of substantially straight-line action and easy adjustability through an exceptionally wide range of operation.

As previously indicated, intermediate arm 12 of spring 10 is pivotally connected to the free extremity 15 of bellows member 43 at the junction of link 47 therewith while parallel external arms 11 are each secured to one of the abutments 14. Now as clamping member 13 is positioned toward the right as viewed in Figure 1, the effective length of the spring 10 is increased and its effect correspondingly weakened. Similarly, movement of clamping member 13 toward the left increases the strength of the spring. Thus, the degree of response of bellows member 43 and its influence upon differential lever 45 may be readily adjusted as desired, and the magnitude of the resetting action of the controller rendered consistent with the demands of the process under control. It should be noted that not only is the adjustment of the effective length of spring 10 readily carried out but such adjustment may, if desired, be effected without shutting down or interfering with the operation of the system. This follows from the fact that when the clamp is loosened sufficiently to permit its movement along spring 10 the response of the control is momentarily broadened.

The aforementioned substantially straight-line action is an important feature of the three-pronged spring and is made clear by comparison of the diagrams in Figures 9 and 10, which illustrate respectively the performance of the cantilever spring of the prior art and that of the present invention. In Figure 9 is shown a "leaf," or cantilever, spring 65 of the prior art, secured at one extremity to an abutment 66, and at its other extremity free for limited deflection. The spring in its un-deflected position is indicated by the dotted lines and in its deflected position by the full lines. If the point of application of the deflecting force be indicated by P, it will be apparent that as the spring is deflected under the influence of a force applied in the direction indicated by the line P—A, the point P will follow a curved path, departing progressively from the line of action as the deflection is increased. This introduces an offset A—B, which must be compensated for by mechanical means, and which may seriously complicate the performance of the apparatus of which the spring forms a part.

In Figure 10 is shown the spring 10 of the present invention, with its two outside leaves or prongs 11 secured as in Figure 1 to abutments 14, and adapted to be deflected by a force applied to the leaf 12 along a line D—Q perpendicular to its principal plane and substantially intersecting the line joining the points of mounting of the abutments 14. It will be observed that as the middle leaf of the spring is deflected through a predetermined distance from its normal plane, the right-hand end of the spring (as seen in the drawings) will be deflected through approximately half that distance. It will also be seen that as the right-hand end of the spring follows a slightly curvilinear path, its distance from the abutments in a horizontal sense will tend to become less, resulting in an offset indicated at E. The offsetting of the right-hand end of the spring toward the left as seen in the drawing will thus tend to compensate for the tendency of the free end of the leaf 12 to be moved toward the right; and by suitably proportioning the dimensions of the middle arm with respect to those of the outer arms of the spring, the compensation may be made substantially complete, resulting in the point of application of force upon the leaf 12 following a substantially straight path in a sense perpendicular to the plane of the spring. Substantial improvement in the sensitivity and accuracy is thereby obtained inasmuch as the deleterious effect of the lost motion inherent in a system including such a spring as that shown in Figure 9 due to the curvilinear motion described is substantially eliminated from the system constructed in accordance with the present invention.

To insure a high degree of precision and at the same time permit reasonable tolerances in the manufacture of various control elements such as bellows member 43, an adjustable calibrating spring 43′ is mounted as indicated on link 47 connected to stem 15 of bellows 43. Normally, arm 12 of spring 10 is freed from link 47 and is in a state of equilibrium while calibrating spring 43′ is adjusted to set the strength of the controller. Then arm 12 is connected to link 47 and the adjustment is such that spring 10 is normally in a neutral position and is equally responsive and effective upon deflection in either direction.

Adjustment of the primary pressure-sensitive member 29 is effected by a spring 48 similar in conformation and construction to the spring 10, and provided with a clamping assembly 49. Spring 48 is mounted with its outside arms secured at their extremities to suitable abutments 50, and with its middle arm pivotally attached to the link 46 which connects the Bourdon spring 29 to the extremity of the floating lever 45. The resiliency of the spring 48 will thus be combined with that of the Bourdon spring 29 in effecting response of the same to internal fluid pressure; and by varying the position of the clamping assembly 49 along the spring 48, the calibration of the measuring element may be adjusted through a considerable range consistent with the physical characteristics of the associated Bourdon spring. The spring 48, like the spring 10, may, if desired, be provided with graduations whereby to provide an indication of its adjusted strength.

The assembly shown in Figure 2 of the drawings corresponds generally to the combination of spring 48 with Bourdon spring 29 of Figure 1, adapted to the operation of a control valve. A fluid-pressure-sensitive element 51, here indicated as a bellows assembly, is mounted on a framework 52 including a pair of abutment members 53 and 54 to which are secured the extremities of the outer arms of a three-pronged spring 55. Also carried by the framework 52 is a valve member 56 having a projecting stem member 57 adapted for engagement by the free extremity of the middle arm of the spring 55 to be actuated thereby. As hereinbefore explained, the effective length of the spring 55 is rendered adjustable by suitably positioning a transverse clamping member 58 and securing it in its adjusted location. The stem member 57 is fitted with an index or pointer 59, which cooperating with a graduated scale 60 carried on the framework 52, provides an indication of the deflected position of said stem and associated parts. In the form of the invention shown in Figure 2, the clamping member 58 is of a simple form embodying a pair of similar and oppositely disposed bars 61—62, positioned transversely of the leaves of the spring and secured by screws 63, passing freely through one, and threadedly engaging the other, of said bars. As indicated, bellows assembly 51 may also be provided with a calibrating spring 51' adjustable as described in connection with spring 43' to adjust the strength of assembly 51.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A fluid pressure actuated controller, comprising valve means including a first movable member for controlling the fluid pressure in said controller when the inlet side of said valve means is connected to a source of fluid under pressure, control means responsive to variations in a controlled medium and including a second member movable through a distance corresponding to said variations, means linking said second movable member with said first movable member and including a reciprocable member, a first elongated resilient arm connected adjacent one end thereof to said reciprocable member, at least two other elongated resilient arms one on either side of said first resilient arm and extending in side by side spaced relation therewith when said arms are unstressed, means rigidly fixing the end portions of said other resilient arms corresponding to the end of said first resilient arm connected to said reciprocable member, and means interconnecting portions of said resilient arms spaced from said ends thereof.

2. A fluid pressure actuated controller, comprising valve means including a first movable member for controlling the fluid pressure in said controller when the inlet side of said valve means is connected to a source of fluid under pressure, control means responsive to variations in a controlled medium and including a second member movable through a distance corresponding to said variations, means linking said second movable member with said first movable member and including a reciprocable member, a first elongated resilient arm connected adjacent one end thereof to said reciprocable member, at least two other elongated resilient arms one on either side of said first resilient arm and extending in side by side spaced relation therewith when said arms are unstressed, means rigidly fixing the end portions of said other resilient arms corresponding to the end of said first resilient arm connected to said reciprocable member, and means interconnecting portions of said resilient arms spaced from said ends thereof and movable longitudinally therealong.

3. A fluid pressure actuated controller, comprising valve means including a first movable member for controlling the fluid pressure in said controller when the inlet side of said valve means is connected to a source of fluid under pressure, primary control means responsive to variations in a controlled medium and including a second movable member movable through a distance corresponding to said variations, secondary control means responsive to the fluid pressure on the output side of said valve means and including a third movable member linearly movable through a distance corresponding to changes in said fluid pressure, means operatively linking said second and third movable members to said first movable member whereby actuation of said primary control means resulting in a change of fluid pressure in a given sense actuates said secondary control means to initiate a change in said fluid pressure in the opposite sense, trifurcated resilient cantilever spring proportionating means mounted with the portion thereof formed by the common juncture of its arms free and movable to any spatial position in response to deflection of a portion of the centrally disposed member of said trifurcated spring means, and said portion of the centrally disposed member being connected to said second and third movable members.

4. A fluid pressure actuated controller, comprising valve means including a first movable member for controlling the fluid pressure in said controller when said valve means is connected to a source of fluid under pressure, primary control means responsive to variations in a controlled medium and including a second movable member movable through a distance corresponding to said variations, secondary control means responsive to the fluid pressure on the output side of said valve means and including a third movable member movable through a distance corresponding to changes in said fluid pressure, means connecting said second and third movable members to said first movable member whereby actuation of said primary control means resulting in a change of fluid pressure in a given sense actuates said secondary control means to initiate a control effect in the opposite sense, and resilient cantilever proportionating means one for each of said second and third movable members and each including an inner elongated resilient member each connected adjacent one end thereof to said second and third movable members respectively, outer elongated resilient members one on either side of each inner resilient member, means restraining against movement the end portions of said outer resilient members corresponding to said ends of said inner resilient members, and means quick releasably interconnecting portions of said outer resilient members to a corresponding portion of the inner resilient member associated therewith and movable longitudinally therealong.

5. In combination with a pressure responsive controller having a movable member movable through a given linear distance in responsive to a predetermined pressure change to which the controller is sensitive, an adjustable proportionating spring assembly for selectively adjusting the linear distance through which said member moves comprising three spaced apart elongated resilient members arranged in side by side relation, means rigidly fixing corresponding end portions of the outer ones of said resilient members with respect to said movable member, clamping means releasably rigidly interconnecting said resilient members and movable longitudinally thereof, one end portion of the inner resilient member corresponding to said fixed end portions being deflectable substantially linearly, and means connecting said one end of the inner resilient member to said movable member, the other end of said inner resilient member moving bilaterally when said one end is deflected.

6. An adjustable spring assembly for selectively varying the linear distance through which the movable member of a pressure responsive controller moves in response to a predetermined variation in pressure, comprising three spaced apart elongated resilient members arranged in side by side relation, means rigidly fixing corresponding end portions of the outer ones of said resilient members, and clamping means for rigidly interconnecting said resilient members and movable longitudinally thereof, an end portion of the inner one of said resilient members corresponding to said fixed end portions of the outer resilient members being deflectable.

7. An adjustable proportionating spring assembly, comprising three spaced elongated resilient members arranged in side by side relation substantially in a common plane, means for rigidly fixing corresponding end portions of the outer ones of said resilient members, and clamping means for rigidly interconnecting other portions of all said resilient members and movable longitudinally thereof, whereby the end portion of the inner one of said members corresponding to said first mentioned end portions is substantially linearly deflectable in a plane normal to said common plane and the interconnected clamped portions of all said members are bilaterally movable.

8. An adjustable proportionating spring assembly, comprising three spaced elongated resilient members arranged in side by side parallel relation, means interconnecting one to the other common end portions of all said resilient members, means for rigidly fixing the remaining end portions of the outer ones of said resilient members, and means for selectively adjusting the resiliency of said resilient members and for interconnecting portions of said resilient members intermediate the ends thereof, said last mentioned means being movable longitudinally with respect to said resilient members.

9. An adjustable proportionating spring assembly, comprising three spaced elongated resilient members arranged in side by side parallel relation and integral one with the other adjacent one end thereof, means for rigidly fixing the remaining end portions of the outer ones of said resilient members, the remaining end portion of said inner resilient member being substantially linearly deflectable, clamping means extending transversely of and longitudinally movable with respect to said resilient members for selectively adjusting the resiliency thereof, and the transverse cross-sectional thickness of the inner resilient member being about twice that of either one of the outer resilient members.

10. An adjustable proportionating spring assembly, comprising three spaced elongated resilient members arranged in side by side parallel relation and integral one with the other adjacent one end thereof, means for rigidly fixing the remaining end portions of the outer ones of said resilient members, the remaining end portion of said inner resilient member being substantially linearly deflectable, and clamping means extending transversely of and longitudinally movable with respect to said resilient members for selectively adjusting the resiliency thereof.

11. A spring assembly, comprising three spaced elongated resilient members arranged in side by side relation, means for rigidly fixing corresponding end portions of the outer ones of said resilient members, means rigidly interconnecting other portions of all said resilient members, and an end portion of the inner one of said resilient members corresponding to said fixed end portions of the outer resilient members being substantially linearly deflectable.

12. A fluid pressure actuated controller, comprising valve means including a first movable member for controlling the fluid pressure in said controller when the inlet side of said valve means is connected to a source of fluid under pressure, control means responsive to variations in a controlled medium and including a second member movable through a distance corresponding to said variations, means linking said second movable member with said first movable member and including a reciprocable member, three elongated resilient arms in spaced side by side relation when said arms are unstressed, means rigidly fixing corresponding portions of the outer ones of said resilient arms, means interconnecting portions of each of said resilient arms and movable therealong towards and away from the fixed portions of said outer arms, and the central one of said elongated resilient arms having a portion thereof corresponding to the fixed portions of said outer resilient arms and connected to said reciprocable member.

References Cited in the file of this patent

UNITED STATES PATENTS

| | | |
|---|---|---|
| 2,298,112 | Edwards et al. | Oct. 6, 1942 |
| 2,310,298 | Kuhl et al. | Feb. 9, 1943 |
| 2,406,181 | Wiegand | Aug. 20, 1946 |
| 2,631,570 | Bowditch | Mar. 17, 1953 |
| 2,652,066 | Bowditch | Sept. 15, 1953 |

FOREIGN PATENTS

| | | |
|---|---|---|
| 604,468 | Great Britain | July 5, 1948 |